Dec. 21, 1937.  A. J. SAARINEN  2,103,020
SIPHON BREAKING MEANS FOR LIQUID METERING SYSTEMS
Filed April 10, 1937  2 Sheets-Sheet 1

Inventor
A. J. Saarinen

WITNESS
H. Woodard

By
Attorney

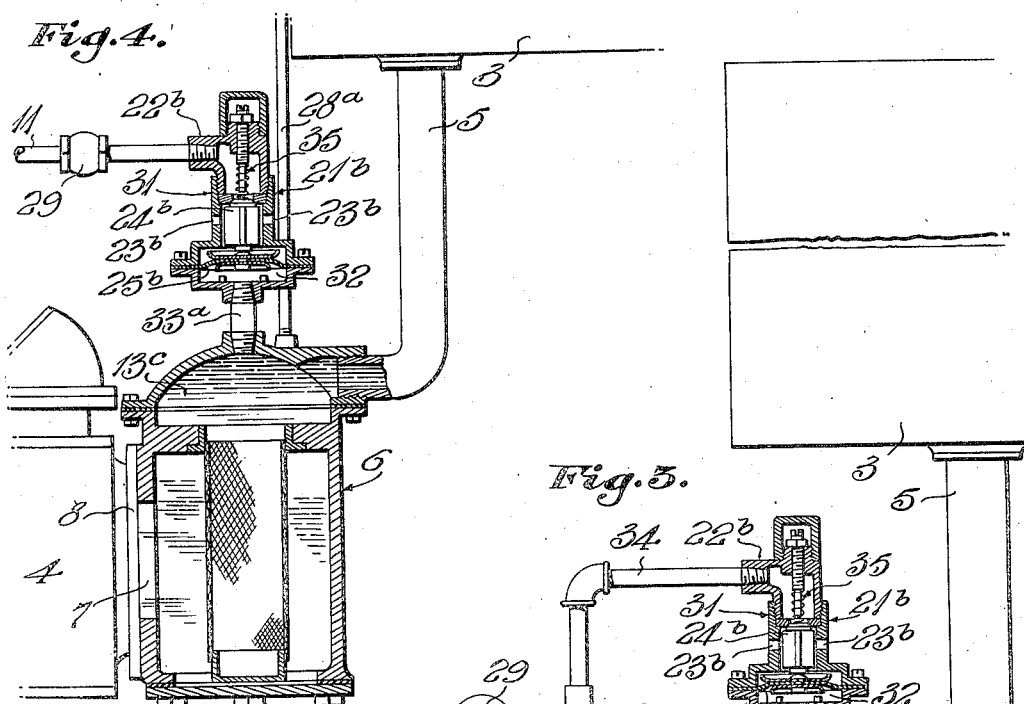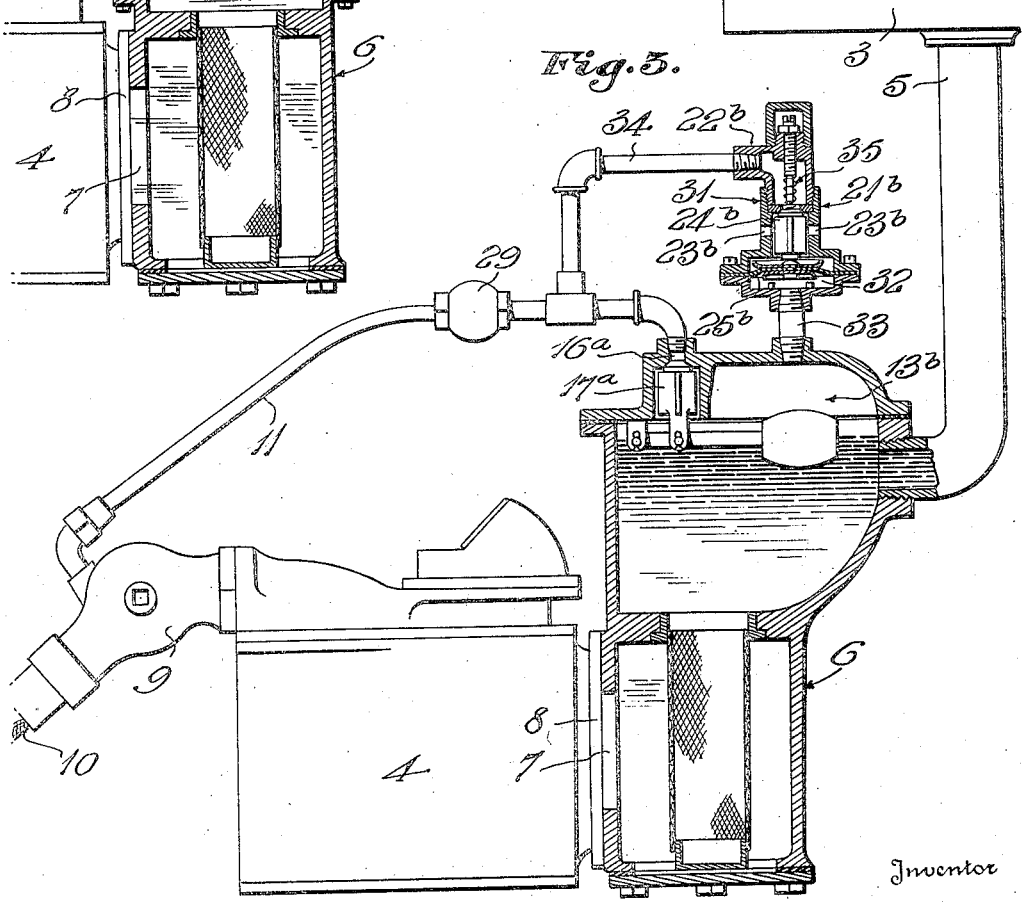

Patented Dec. 21, 1937

2,103,020

UNITED STATES PATENT OFFICE 2,103,020

SIPHON-BREAKING MEANS FOR LIQUID METERING SYSTEMS

Armas J. Saarinen, San Francisco, Calif., assignor to Granberg Meter Corporation, San Francisco, Calif., a corporation of California Application April 10, 1937, Serial No. 136,184

6 Claims. (Cl. 221—67)

The invention relates to a liquid metering system used primarily for measuring gasoline or oil as it is discharged from a tank, such systems being commonly employed for filling tank trucks with gasoline or fuel oil from storage tanks, for filling the tanks of gasoline dispensing stations with gasoline from tank trucks, and for filling the tanks of oil burning systems with fuel oil from tank trucks. With systems of this nature ordinarily relying on gravity flow, the suction or negative pressure exerted by the hose increases as the tank becomes empty, and if unbroken the siphonic action in the meter produced by this suction would totally or partially empty the meter upon emptying of the tank, allowing air or gas to enter said meter and thereby causing inaccuracy both at the end of one liquid delivery operation and at the start of the next. To prevent this, it is customary to provide the system with a siphon breaker, the purpose of which is to admit air into a suitable portion of said system at the outlet side of the meter to break the siphonic action at the proper time. In certain metering systems, this air has been supplied from a chamber which is instrumental in venting air and gases from the system at the inlet side of the meter to protect the latter against entrance of such air and gases. The liquid in discharging from the tank flows through this chamber and when the tank is about empty, said chamber receives air from the tank through the same passage which conducts the liquid from said tank to said chamber, and it has been the air entering through this passage which has been used for the purpose of breaking the siphon. However, due to interruption of the air supply by "slugs" of liquid passing through the aforesaid passage, the chamber often does not contain sufficient air to break the siphon when the siphon breaker first operates, and consequently said siphon breaker must operate repeatedly before the siphon is finally broken, often allowing air or gas to enter the meter in the meantime.

To overcome the above defect, it has been proposed by one—Walter S. Brubaker of San Francisco, California (in his U. S. patent application Serial No. 135,164, filed April 5, 1937), to make provision whereby the siphon-breaking air is supplied from a source other than the above discussed chamber and unaffected by liquid flow through the system, said source preferably being free atmospheric air external to said system, said air being either in addition to or in lieu of that supplied from the aforesaid chamber. The present invention makes provision for obtaining the same result, but provides a different structure for so doing, said structure being such that the valve for admitting the air from the source unaffected by liquid flow, is operated by pressure-actuated means independent of the float which actuates the air release valve of the aforesaid chamber, and independent of any other airventing means which may be provided for said chamber.

With the foregoing in view, the invention resides in the novel subject matter hereinafter described and claimed, description being accomplished by reference to the accompanying drawings.

Figs. 3 and 4 are views similar to Figs. 1 and 2 respectively but showing modifications.

Figures 1, 2:
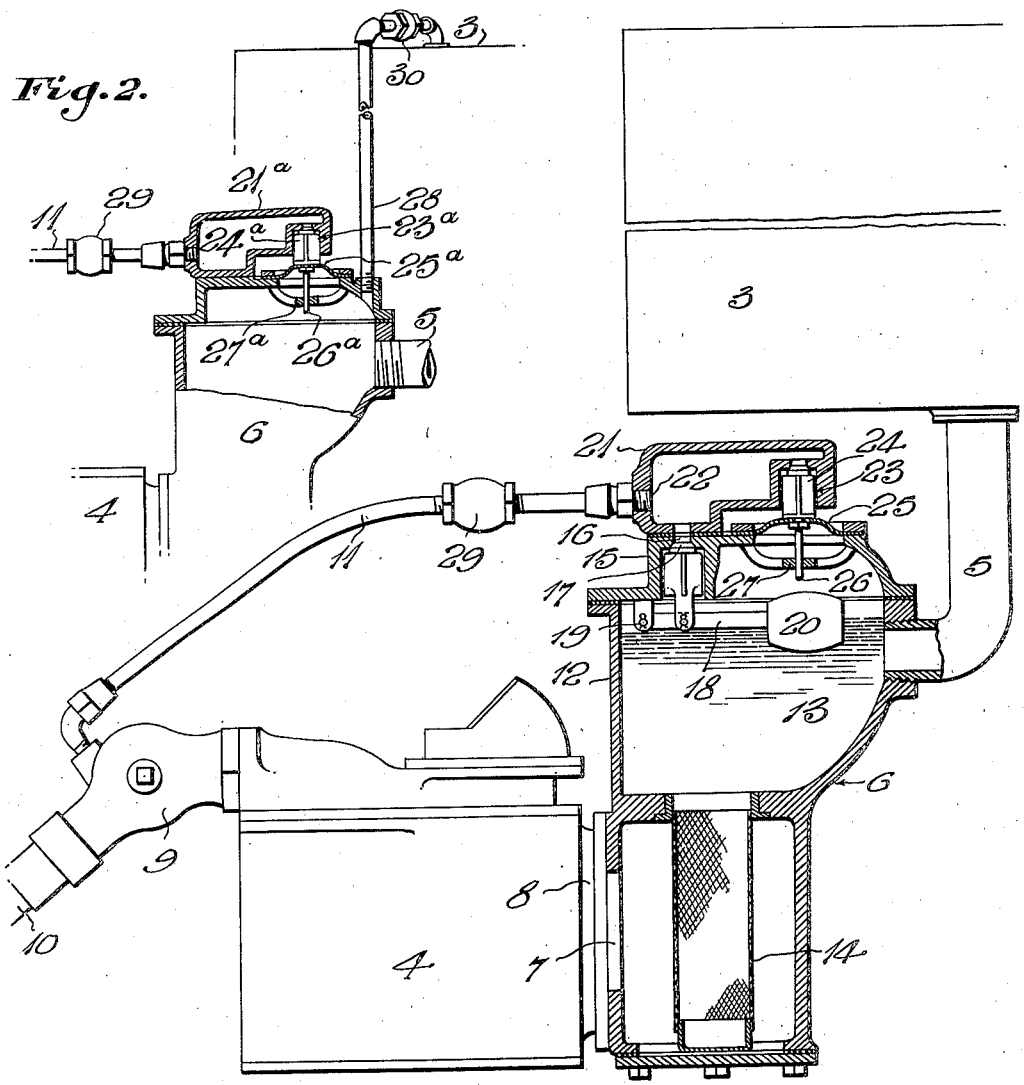
Fig. 1 is a combined sectional view and side elevation of a liquid metering system including the present invention.
Fig. 2 is a view similar to Fig. 1, but showing a vent line instead of a float-controlled vent valve for the above discussed chamber.

In the drawings above briefly described, the numeral 3 denotes a tank from which liquid is to be discharged through a meter 4 without allowing entrance of air or gas to said meter. A discharge pipe 5 has been shown extending from the bottom of the tank 3 to the inlet of a combined air release device, siphon breaker and strainer 6, the outlet 7 of this combined device being appropriately connected either directly to or by piping, with the inlet 8 of the meter 4. A liquid discharge line leads from the meter and in the present disclosure includes a faucet 9 and a hose 10. In Figs. 1 and 3 of the present showing, the device 6 is connected with the faucet 9 by means of an air-conducting line 11 for the purpose of admitting the siphon-breaking air at the proper time, but said device 6 could, of course, be connected with any part of the system forming the high point on the discharge side of the meter. While I may refer to the siphon breaker or the like 6 as being disposed at the inlet side of the meter, the language "at the inlet side" is not to be restricted as meaning directly adjacent to the meter, for the desired results could be obtained with said siphon breaker or the like positioned at any suitable location between the meter 4 and the tank 3.

The device 6 in Fig. 1 includes a casing 12 having a chamber 13 which receives the liquid from the tank 3, and a strainer 14 is suitably mounted in said casing 12 to strain the liquid before it leaves through the outlet 7 for passage through the meter 4.

The top 15 of the casing 12 is provided with an air and gas vent 16, and an upwardly closing winged valve 17 is provided for said vent, the lower end of said valve being connected with a lever 18 fulcrumed at 19 and provided with a float 20 operated by the liquid in the chamber 13.

Secured upon the casing top 15, is a valve casing 21 which communicates with the vent 16, said valve casing having an air outlet 22 which is connected by the air-conducting line 11 with the faucet 9 or other appropriate part of the system. Whenever flow starts, with the float 20 in lowered position and the valve 17 open, all air and gas vent from the top of the chamber 13 into the valve casing 21 and flow through the line 11 beyond the meter 6 so that they cannot enter the latter. When the chamber 13 fills sufficiently with liquid, this liquid raises the float 20, thereby closing the valve 17, and the gas-and-air-free liquid flows on through the meter. When the tank 3 is about empty, some air enters the chamber 13 through the line 5 and the liquid in said chamber then lowers, causing float 20 to move downwardly and open the valve 17. This allows passage of air from the upper end of the chamber 13 through the vent 16, valve casing 21 and air line 11, into the system at the high point thereof beyond the meter 4. However, due to the fact that the line 5 does not cleanly open and remain open when the tank is about empty but on the contrary repeatedly opens and closes due to passage of "slugs" of liquid therethrough, the chamber 13 often contains an insufficient quantity of air to break the siphon the first time the mechanism operates, even though this air actually enters the liquid stream through the passage 11. Consequently, the mechanism must often operate repeatedly before the siphonic action is finally broken, often allowing air or gas to enter the meter in the meantime. Due to the construction now to be described, admitting siphon-breaking air from a source unaffected by liquid flow through the system, the difficulty is overcome and the siphon is promptly broken the first time the siphon breaker functions.

Furthermore, due to the provision for an adjustable spring to aid and control the action of the diaphragm in opening the air admitting valve as hereinafter described, the siphonic action can be broken at any desired time during the emptying of the tank, thus making certain that no air will pass through the meter such as ordinarily happens with siphon breakers now in use, which act only when air has collected in the float chamber located on the inlet side of the meter, and which chamber fails many times to collect the small air bubbles that may be present in the liquid stream while the tank is emptying.

I provide the valve casing 21 with an air inlet 23 which preferably communicates with the atmospheric air at the exterior of the system, and I provide a second winged valve 24 for controlling said air inlet 23, said valve 24 being connected with a pressure-actuated valve-operating device whose pressure-moved member 25 forms part of the wall of the chamber 13 in the form of construction under consideration. The member 25 is preferably a diaphragm suitably secured to the casing top 15 and to the valve 24, and said valve may well be provided with a downwardly projecting stem 26 extending below said diaphragm and slidably engaged with a suitable guide 27. While the lower end of the stem 26 is shown directly above the float 20 and it therefore appears that the float might coact with said stem, this is not the case. On the contrary, the valve 24 which carries the stem 26, is actuated solely by the diaphragm or the like 25, and the float 20 performs the sole function of actuating the valve 17, said diaphragm being operated by the pressure differential within and without the chamber 13 and said float being of course actuated only by following the rise and fall of liquid in said chamber.

When liquid is being discharged from the tank 3, the float 20 holds the valve 17 closed. At the same time, the pressure within the chamber 13 being greater than that at the exterior of said chamber, the diaphragm or the like 25 is held in an upward position, holding the valve 24 closed. When the tank 3 is about empty, however, and sufficient air enters the chamber 13 to allow the float 20 to drop, said float opens the valve 17. At the same time, reduction of pressure in the chamber 13 effects downward movement of the diaphragm or the like 25, thereby opening the valve 24. The result is that some air from the upper end of the chamber 13 will flow therefrom through the vent 16 into the casing 21 and air will also enter said casing through the passage 23, the air from both sources flowing on through the air-conducting line 11 into the faucet 9, the supply of air being adequate to promptly break the siphonic action. The reason for air entering casing 21, at 16 and 23, is because the pressure at the faucet is less than atmospheric pressure due to the suction effect of the hose. The quantity of air flowing from the chamber 13 into the casing 21 may in some instances be almost negligible for siphon-breaking purposes, but the air entering through the inlet 23 will be adequate to perform the required function.

While in the form of construction so far described, the float-controlled valve 17 is relied upon to vent air and gases from the chamber 13 when flow starts, such a valve may be dispensed with and a vent line 28 may lead to the top of the tank 3 or to other suitable point for performing the same function as said valve 17, except that it of course supplies no air for siphon-breaking purposes. This modified construction, including the vent line 28 and omitting the valve 17 and its operating means, is shown in Fig. 2. In this form of construction, the pressure-actuated valve 24ª controls the sole inlet 23ª provided in the casing 21ª for the siphon-breaking air. A diaphragm, stem, and stem guide for the valve 24ª, are shown at 25ª, 26ª, and 27ª respectively.

Figs. 3 and 4 illustrate a special pressure-actuated valve unit 31 which may be employed if desired. Fig. 3 shows one application of this unit 31 to a system in which a float-actuated vent valve 17ª is used, and Fig. 4 discloses one application of said unit 31 to a system in which a vent line 28ª is employed instead of a float-actuated vent valve.

The unit 31 may be of any desired construction and that shown embodies a casing 21ᵇ having an air outlet 22ᵇ and air inlets 23ᵇ; a valve 24ᵇ for controlling the passage of air from said inlets to said outlet, and a pressure-actuated operating device for said valve including a diaphragm or the like 25ᵇ and a pressure chamber 32.

In Fig. 3, the chamber 32 is connected by a nipple 33 with the air chamber 13ᵇ, the air vent 16ª is directly connected with the air-conducting line 11, and a branch line 34 connects the air outlet 22ᵇ with said line 11.

In Fig. 4, the chamber 32 is connected by a nipple 33ª with a much reduced air chamber 13ᶜ and the air-conducting line 11 is directly connected with the outlet 22ᵇ.

The structures shown in Figs. 3 and 4 function in the same ways as those shown in Figs. 1 and 2 respectively, to admit the siphon-breaking air at the proper time. Preferably, however, the unit 31 includes an adjustable spring 35 to aid atmospheric pressure, acting on the diaphragm or the like 25ᵇ, in opening the valve 24ᵇ. By the use of this adjustable spring 35 to aid and control the action of the diaphragm 25ᵇ in opening the air-admitting valve 24ᵇ, the siphonic action can be broken at any desired time during the emptying of the tank 3, (even before the liquid level lowers sufficiently to admit any air into the liquid discharge line 5 if desired) thus making certain that no air will pass through the meter such as ordinarily happens with siphon breakers now in use, which act only when air has collected in the float chamber located on the inlet side of the meter, and which chamber fails many times to collect the small air bubbles that may be present in the liquid stream while the tank is emptying.

While the unit 31 is shown mounted on the device 6, this is obviously not essential as said unit could be located at any suitable point and connected with the proper parts of the system by conveniently arranged piping. It is preferable, however, that said unit 31 be located at some point in elevation between the level of the connection to the faucet 9 and the level of the bottom of the storage tank 3.

In all forms of construction, it is preferable to provide the air line 11 with a check valve 29 which closes toward the device 6, for when the tank 3 is substantially full, such plus pressure may exist in the portion of the system beyond the meter as to otherwise possibly cause back-flow of liquid through said line 11. It is also advisable, when the vent line 28 or 28ª is used, as in Figs. 2 and 4, to provide said line with a check valve 30 (shown only in Fig. 2) which closes toward the device 6, preventing air or gas from being drawn into the separator chamber through said line and becoming possibly entrained with the liquid flowing on to the meter, in case by possible combination of circumstances negative pressure would be set up on the inlet side of the meter. When the branch 34 is used, it should connect with the line 11 between the check valve 29 and the device 6.

It will be seen from the foregoing that novel and advantageous provision has been made for carrying out the object of the invention, and while the present disclosure may be considered as preferred, it is also to be considered as illustrative rather than limiting, for numerous variations may be made within the scope of the invention as claimed.

I claim:—

1. In a liquid metering system in which unbroken siphonic action would empty the meter, said system having an air eliminator casing through which liquid flows to the meter; means controlled partly by the liquid level in said casing and partly by the pressure within said casing for venting air and gases from said casing as it fills with liquid and for later conducting some siphon-breaking air from said casing and some siphon-breaking air from another source into a portion of the system at the outlet side of the meter.

2. In a liquid metering system in which unbroken siphonic action would empty the meter, said system having an air eliminator casing through which liquid flows to the meter; means for venting air and gases from said casing as it fills with liquid and for later conducting siphon-breaking air to a portion of the system at the outlet side of the meter, said means including one valve controlled by the liquid level in said casing for conducting some of the siphon-breaking air from this casing and a second valve controlled by the pressure within said casing for conducting the rest of the siphon-breaking air from another source.

3. In a liquid metering system, a siphon breaker comprising a casing having part of its wall formed by a diaphragm, a valve casing secured to the first named casing and having an air inlet portion in spaced opposed relation with the outer side of said diaphragm, a valve for said air inlet portion of said valve casing operatively connected with said diaphragm, and an outlet from said valve casing for conducting siphon-breaking air therefrom.

4. In a liquid metering system, a combined air eliminator and siphon breaker comprising a casing having part of its wall formed by a diaphragm, said casing having an air and gas vent near said diaphragm, a valve casing secured to the first named casing in communication with said vent to receive some siphon-breaking air therefrom, said valve casing having an air inlet independent of said first named casing for receiving additional siphon-breaking air from another source, one valve for said vent controlled by the liquid within said first named casing, a second valve for said independent air inlet operatively connected with said diaphragm, and an outlet from said valve casing for conducting the siphon-breaking air therefrom.

5. In a liquid metering system, a combined air eliminator and siphon breaker comprising a casing having part of its wall formed by a diaphragm, said casing having an air and gas vent near said diaphragm, a valve casing having one portion secured to the first named casing in communication with said vent to receive some siphon-breaking air from said vent, said valve casing being provided also with a projecting air inlet portion in spaced opposed relation with the outer side of said diaphragm for receiving additional siphon-breaking air from a source independent of said casing, a valve for said vent controlled by the liquid in the first named casing, a second valve for said projecting air inlet portion operatively connected with said diaphragm, and an outlet for said valve casing for conducting the siphon-breaking air therefrom.

6. In a liquid metering system, a combined air eliminator and siphon-breaker comprising a casing having an air and gas vent, a valve for said vent and means controlled by the liquid in said casing for operating said valve, a pipe connected with said vent for conducting some siphon-breaking air therefrom, a valve casing having an inlet for additional siphon-breaking air, outlet means for this additional siphon-breaking air connected with said pipe, and a second valve controlled by the pressure in said casing for controlling the passage of said additional air from said inlet to said outlet means.

ARMAS J. SAARINEN.